US009807445B2

(12) United States Patent
Mountain

(10) Patent No.: US 9,807,445 B2
(45) Date of Patent: Oct. 31, 2017

(54) PHOTOSENSITIVITY PROTECTION FOR VIDEO DISPLAY

(71) Applicant: ECHOSTAR UK HOLDINGS LIMITED, Steeton, Keighley (GB)

(72) Inventor: Dale Llewelyn Mountain, West Yorkshire (GB)

(73) Assignee: EchoStar Technologies L.L.C., Englewood, CO (US)

(*) Notice: Subject to any disclaimer, the term of this patent is extended or adjusted under 35 U.S.C. 154(b) by 396 days.

(21) Appl. No.: 13/689,516

(22) Filed: Nov. 29, 2012

(65) Prior Publication Data
US 2014/0150012 A1 May 29, 2014

(51) Int. Cl.
| H04N 21/431 | (2011.01) |
| H04N 21/44 | (2011.01) |
| H04N 21/8543 | (2011.01) |
| H04N 9/82 | (2006.01) |
| G06T 5/00 | (2006.01) |
| H04N 21/454 | (2011.01) |
| H04N 21/435 | (2011.01) |

(52) U.S. Cl.
CPC ... H04N 21/4312 (2013.01); H04N 21/44008 (2013.01); H04N 21/4542 (2013.01); G06T 5/00 (2013.01); H04N 9/8205 (2013.01); H04N 21/435 (2013.01); H04N 21/8543 (2013.01)

(58) Field of Classification Search
CPC ........... H04N 21/8193; H04N 21/4312; H04N 21/454; H04N 21/8543; H04N 21/23418; H04N 21/44008; H04N 9/8205; H04N 9/87

See application file for complete search history.

(56) References Cited

U.S. PATENT DOCUMENTS 3,651,372 A * 3/1972 Uchida et al. ............... 315/134
5,801,748 A * 9/1998 Hohenacker ................. 725/20
6,515,709 B1 * 2/2003 Kamada ....................... 348/553
(Continued)

FOREIGN PATENT DOCUMENTS

JP WO 03090168 A1 * 10/2003 ............... G06T 5/00
JP 2007194742 A * 8/2007

OTHER PUBLICATIONS

"ITC Guidance Note for Licensees on Flashing Images and Regular Patterns in Television" by The Independent Television Commission, Jul. 2001.*
(Continued)

Primary Examiner — Brian T Pendleton
Assistant Examiner — Krista A Contino Saumby
(74) Attorney, Agent, or Firm — Kilpatrick Townsend & Stockton LLP

(57) ABSTRACT

Systems and methods for providing photosensitivity protection for content displayable with a screen display are provided. Content, which may include video content, may be received at a media device. A portion of the video content that corresponds to flashing images may be identified with the media device. A precaution against the flashing images may be identified based at least in part on the identifying of the portion of the video content that corresponds to flashing images. One or more of at least a portion of the video content and/or information about the video content may be displayed based at least in part on the precaution.

20 Claims, 6 Drawing Sheets

(56) References Cited

U.S. PATENT DOCUMENTS

| | | | |
|---|---|---|---|
| 2003/0159144 A1* | 8/2003 | Kitagawa et al. ............... 725/44 |
| 2003/0227565 A1* | 12/2003 | Hamilton ........... H04N 21/4884 |
| | | | 348/468 |
| 2005/0108642 A1* | 5/2005 | Sinclair, II .......... G06F 9/44505 |
| | | | 715/700 |
| 2005/0138674 A1* | 6/2005 | Howard et al. ............... 725/136 |
| 2006/0139312 A1* | 6/2006 | Sinclair, II ............ G06F 3/0481 |
| | | | 345/156 |
| 2006/0192851 A1* | 8/2006 | Sugahara et al. ............... 348/51 |
| 2007/0288847 A1* | 12/2007 | Yoon et al. .................... 715/720 |
| 2009/0059581 A1* | 3/2009 | Hayashi et al. ............... 362/234 |
| 2009/0190945 A1* | 7/2009 | Nomura et al. ................ 399/51 |
| 2013/0169762 A1* | 7/2013 | Kanemaru et al. ........... 348/51 |
| 2013/0169880 A1* | 7/2013 | Ferguson ........... G06K 9/00718 |
| | | | 348/607 |
| 2014/0026054 A1* | 1/2014 | Rav-Acha ........... G06F 3/04883 |
| | | | 715/723 |

OTHER PUBLICATIONS

JP 2007194742 A translation from Google Translate available at https://patents.google.com/patent/JP2007194742A/en.*

* cited by examiner

PHOTOSENSITIVITY PROTECTION FOR VIDEO DISPLAY

TECHNICAL FIELD

This disclosure relates to apparatus and methods of content display, and particularly to implementing photosensitivity protection for video display.

BACKGROUND

Some people suffer from photosensitive epilepsy, a condition which can cause seizures if an individual views images contained repeatedly flashing light. For example, a televised program including a dance club scene with strobe lighting or a scene with many camera flashes may cause adverse reactions in certain viewers. As a result, certain viewers are not able to watch certain programs. It is not uncommon for a televised program to have a warning broadcasted before the program begins, warning of the dangers to people with photo-sensitivities. However, a viewer may miss such a warning. Even if a viewer sees the warning, the viewer may not know when during the program the flashes are to occur, but may nonetheless attempt to watch the program and anticipate where in the program the flashes may occurs in order to stop watching during those periods. Of course, such an approach is risky.

Thus, viewing options are limited and potentially dangerous for certain viewers. Accordingly, there is a need for photosensitivity protection for video display that addresses these challenges. These and other needs are addressed by the present disclosure.

SUMMARY

Various methods, systems, and computer products are disclosed for implementing photosensitivity protection for video display. In some embodiments, a program stream may be marked such that flashing image portions of the stream are identified for a television tuner device. In some embodiments, a program stream may be marked at distribution such that the television tuner device receives a pre-marked stream. In some embodiments, the television tuner device may then suitable handle the flashing images in those marked portions of the received video stream.

In some embodiments, the television tuner device may skip a flashing image portion of the video stream. In some embodiments, the television tuner device may buffer the video stream to facilitate the skipping of a flashing image portion of the video stream. In some embodiments, the television tuner device may halt the video during those portions of the video stream.

In some embodiments, the television tuner device may allow for user selection of a precaution mode, wherein the television tuner device may protectively handle the flashing images. In some embodiments, the television tuner device may identify a potentially problematic program stream and may automatically prompt for user selection of a precaution mode, whereupon the user having selected the precaution mode, the television tuner device may protectively handle the flashing images. In some embodiments, a program stream may be buffered, in a digital video recorder (DVR)/programmable video recorder (PVR), for example. Accordingly, the program as displayed to the viewer may be delayed (e.g., 5 seconds, or any suitable time period) with respect to live viewing.

In some embodiments, a processor (such as a main processor, a core processor, digital signal processor) may perform auto-correlation of related images in a buffered/recorded video stream to measure characteristics of the images. In some embodiments, the brightness of certain frames of a video stream may be measured. In some embodiments, brightness may be measured by quantifying color characteristics. In some embodiments, peaks/increases/decreases/fluctuations of brightness relative to brightness of other frames may be identified. In some embodiments, successive peaks/increases/decreases/fluctuations of brightness may be taken as an indication of potential problematic portion of the program stream.

In some embodiments, the television tuner device may dim a flashing image portion of the video stream. In some embodiments, the television tuner device may dim the whole picture corresponding to a flashing image portion of the video stream. In some embodiments, the television tuner device may detect particular areas in the picture and dim those particular areas, as opposed to dimming the whole picture. In some embodiments, the television tuner device may equalize, or generally equalize, color components for those portions so that the flashing is not as sharp as it otherwise would be. In some embodiments, the television tuner device may mute those portions of the video stream in other suitable way.

In some embodiments, a method for providing photosensitivity protection for content displayable with a screen display is disclosed. The method may include receiving content at a media device, wherein the content comprises video content. The method may include identifying, with the media device, a portion of the video content that corresponds to flashing images. The method may include identifying a precaution against the flashing images based at least in part on the identifying of the portion of the video content that corresponds to flashing images. The method may include displaying, based at least in part on the precaution, one or more of at least a portion of the video content and/or information about the video content.

In some embodiments, a system for providing photosensitivity protection for content displayable with a screen display is disclosed. The system may include a display device comprising a screen display. The system may include a media device communicatively coupled to the display device. The media device may include one or more processors and memory communicatively coupled with, and readable by, the one or more processors, the memory having stored therein processor-readable instructions. The instructions, when executed by the one or more processors, may cause the one or more processors to receive content comprising video content, identify a portion of the video content that corresponds to flashing images, and identify a precaution against the flashing images based at least in part on the identifying of the portion of the video content that corresponds to flashing images. The instructions, when executed by the one or more processors, may cause the one or more processors to output to the display device, based at least in part on the precaution, one or more of at least a portion of the video content and/or information about the video content.

In some embodiments, a computer-readable medium for providing photosensitivity protection for content displayable with a screen display, having sets of instructions stored thereon, is disclosed. The instructions, when executed by a computer, may cause the computer to: receive content comprising video content; identify a portion of the video content that corresponds to flashing images; identify a precaution against the flashing images based at least in part on the identifying of the portion of the video content that corresponds to flashing images; and output to a display device, based at least in part on the precaution, one or more of at least a portion of the video content and/or information about the video content Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures in conjunction with the description of certain embodiments presented herein. However, the appended figures should be seen as limiting or defining the present disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain embodiments of the present disclosure are directed to apparatus and methods of content display, and particularly to implementing photosensitivity protection for video display. The systems, apparatus, and methods may provide precautionary measures for photosensitivities. In some embodiments, precautionary measures may eliminate the need for warnings being broadcasted before a potentially harmful program begins. In some embodiments, precautionary measures may allow view with photo-sensitivities to view programs without interruption and apprehension. These and other benefits will be explained in detail below.

Although embodiments detailed herein may be directed toward controlling television-based equipment, the principles easily can be extended to other types of content and devices, such as video game equipment, computer equipment, handheld electronic devices, and the like. In addition, the terms "television" or "television service" can include traditional television programming, such as linear television programs, as well as other types of audio, video and/or audio/video content, such as on-demand video content, streaming video content and the like delivered via any type of content delivery systems, such as a cable, satellite, cellular/wireless, Internet/IP and/or any other content delivery technology or system currently known or hereafter developed. Furthermore, embodiments herein describe set-top boxes and/or other devices being connected with a television or other device having an electronic display. However, photosensitivity protection features can also be incorporated into the device having the electronic display, such as a television with an integrated cable, satellite or IPTV receiver. The technology discussed herein additionally can be extended to any of a variety of other electronic display devices, such as, for example, computers, tablets, hand-held mobile devices, cell phones, e-readers, personal media players, and the like. A person of ordinary skill in the art will recognize various alterations, additions, omissions, and substitutions.

Figure 1:
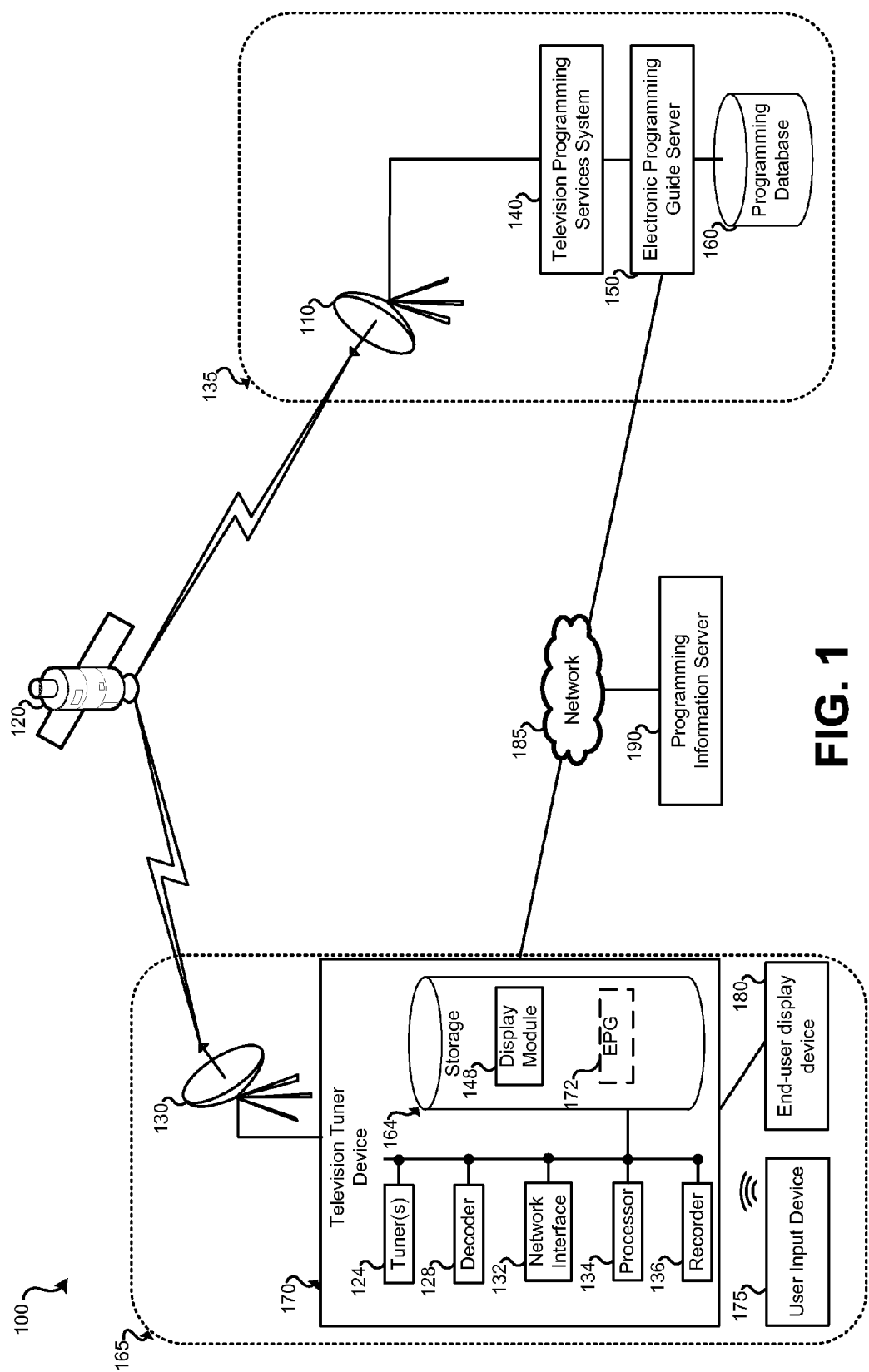
FIG. 1 illustrates an embodiment of a system, in accordance with certain embodiments of the present disclosure.

FIG. 1 illustrates an embodiment of a system 100, in accordance with certain embodiments of the present disclosure. The system 100 may include: a television service provider 135, an uplink station 110, a television programming services system 140, an electronic programming guide server 150, a programming database 160, a satellite 120, an end-user system 165, end-user equipment 130, a television tuner device 170, a user input device 175, an end-user display device 180, a network 185, and a programming information server 190. In some embodiments, more or fewer components may be present.

In some embodiments, a satellite-based television service, such as direct broadcast satellite (DBS) service, is used to deliver television services to end-users. DBS service may involve television channels and/or other content (e.g., on-demand programming) being transmitted via a satellite uplink and multiple downlinks to end-user equipment configured to receive satellite transmissions. As such, a single uplink (or multiple uplinks) may be used to deliver television channels and other content to a large number of end-users.

In the system 100, the uplink station 110 is configured to transmit one or more television channels and/or other content to the satellite 120. The satellite 120 may be located in geosynchronous orbit to provide continuous service to a particular geographical area. The satellite 120 may serve to relay information received from the uplink station 110 to a plurality of sets of end-user equipment such as the end-user equipment 130. In the system 100, only equipment linked to a single set of end-user equipment is illustrated for the sake of simplicity. For example, the end-user system 165 may contain the components present at an end-user's home or business. It should be understood that the system 100 may be used to deliver television channels and other content to many end-users, which may involve many end-user systems similar to the end-user system 165.

The end-user system 165 may include the television tuner device 170. The television tuner device 170 may be associated with or located near an individual, business, or other entity, user or subscriber that receives a program service transmission from the service provider 135. The program service transmission may be received through a subscription to the service. Generally the terms "user" and/or "subscriber" refer to an individual or company who receives a program service transmission. This may include those who have purchased a subscription to the program service transmission. Additionally, the terms "user" and/or "subscriber"

may refer to individuals who have been given access to the program service transmission through promotional offers and/or other non-fee-based agreements.

The television programming services system 140 may represent one or more computer systems that are configured to provide one or more television channels and/or other content to the uplink station 110 to be delivered to the end-user equipment 130. The electronic programming guide server 150 may be part of the television programming services system 140 or may be separate. The electronic programming guide server 150 may provide television programming information to the television tuner device 170.

The electronic programming guide server 150 may communicate with one or more programming databases, such as the programming database 160. The programming database 160 may be located locally to electronic programming guide server 150 or may be remotely accessible. The programming database 160 may contain television programming information to be presented to end-users.

The television service provider 135 may own, manage, and/or operate the uplink station 110, the television programming services system 140, the electronic programming guide server 150, and/or the programming database 160. There may be more than one television service provider 135. In some embodiments, some or all of these components may be owned and/or operated by entities other than the television service provider 135.

The end-user equipment 130 may be configured to receive DBS service. The downlink from the satellite 120 to the end-user equipment 130 may be unidirectional. As such, while signals may be transmitted from the satellite 120 to the end-user equipment 130, signals may not be transmitted from the end-user equipment 130 to the satellite 120. Thus, while information may be received by the end-user equipment 130 from the television service provider 135 via the satellite 120, it may not be possible to use the same communication link to transmit information back to the television service provider 135. However, in some embodiments, the satellite communication link may be bidirectional.

The end-user equipment 130 may include one or more satellite dishes configured to receive signals from the satellite 120. In some embodiments, the end-user equipment 130 may include a single satellite dish equipped with multiple tuners. In some embodiments, a single tuner is connected with a satellite dish. In the system 100, a single television tuner device, the television tuner device 170 equipped with a tuner 124, is illustrated as connected with the end-user equipment 130. It should be understood that, in other embodiments, the end-user equipment 130 may be connected with multiple television tuner devices.

The television tuner device 170 may be or include a standalone piece of equipment, such as a set-top box. In some embodiments, the television tuner device 170 may be incorporated as part of another device, such as a television (or some other form of the end-user display device 180). The television tuner device 170 may communicate with multiple other pieces of equipment, such as the user input device 175, and the end-user display device 180. The end-user display device 180 may be a device that is used to display television channels and/or other televised content to an end-user. Examples of possible end-user display devices may include: televisions, computer systems, and mobile devices.

The television tuner device 170 may serve as an interface between the signals received from the satellite 120 by the end-user equipment 130 and the end-user display device 180. The television tuner device 170 may be configured to receive, analyze, and transmit information received from the satellite 120 by the end-user equipment 130 to the end-user display device 180. The television tuner device 170 may include a decoder 128 to decode received signals. The decoder 128 may be programmed to decrypt or otherwise decode some or all of the received signals in accordance with purchases and selections made by a user.

While the television tuner device 170 may receive information via the satellite 120 from the television service provider 135, this communication link may not allow information to be transmitted from the television tuner device 170 back to the television service provider 135, in certain embodiments. As such, another communication link may be used for communication that originates from the television tuner device 170. In the example depicted, the television tuner device 170 is in communication with the network 185.

The television tuner device 170 may include a network interface 132. The network interface 132 may be operable to communicate or send information across a data network, such as a packet based data network 185. The network interface 132 may take the form of a modem network interface card, cable plug or jack, or the like. Using the network interface 132, the television tuner device 170 may communicate over a network 185 such as the public switched telephone network (PSTN). However, it should be appreciated that the network 185 may be any type of network capable of data communication, such as, for example, a local or wide area network or the Internet. The television tuner device 170 may be configured to communicate via a home Wi-Fi network, a local area network, a cable modem, DSL modem, or any other form of available connection with the Internet. The television tuner device 170 may communicate through the network interface 132 using any suitable communication protocol such as TCP/IP. The television tuner device 170 may communicate with one or more websites through the network interface 132. In so doing, the television tuner device 170 may reference and receive information or other content that may be outputted on a display to provide an enhanced or expanded graphical user interface (GUI), in accordance with an example embodiment.

Through the network interface 132, a user may communicate with the service provider 135 in some embodiments. For example, a request for specific television programming information may be communicated to the service provider 135. As another example, the television tuner device 170 may be able to communicate with the electronic programming guide server 150. The television tuner device 170 may receive information or other content that may be outputted on the display 180 from the service provider 135. This information could include audiovisual clips or the like. Thus, while in the system 100 television programming information may be received by the television tuner device 170 via the satellite 120, it should be understood that in some embodiments television programming information may be transmitted to the television tuner device 170 by the electronic programming guide server 150 via the network 185. As such, the communication link between the television tuner device 170 and the electronic programming guide server 150 via the network 185 may be used for bidirectional communication.

In the system 100, television channels and/or other content may be delivered to end-users via a direct broadcast satellite arrangement. However, it should be understood that embodiments of this disclosure may pertain to other forms of televised content delivery. For example, cable television, which utilizes a cable network, may utilize various arrangements for organizing search results within an electronic programming guide as described herein. Similarly, a fiber-based television network and/or IP-based television network may utilize various arrangements for organizing search results within an electronic programming guide as described herein.

As depicted, the television tuner device 170 may be in communication with one or more programming information servers, such as the programming information server 190, e.g., via the network 185. The programming information server 190 may represent a computer system containing information on television programs and/or other content. For example, the programming information server 190 may have additional information about television programs and/or content in addition to (and/or the same as) what is present in the television programming information transmitted to the television tuner device 170 by the electronic programming guide server 150.

The television tuner device 170 may include one or more processors 134 operable to run executable code in connection with various functions associated with the television tuner device 170. For example, the processor 134 may display graphics, images, animations or other content on the display 180, such as a television (TV) or monitor. In the case of receiving commands or other information relating to changes to the account status, the processor 134 may be further operable to initiate or facilitate transmission of one or more messages to the service provider 135. The processor 134 may be further operable to recall and display stored content, such as purchased or recorded programs.

Among other functions, the processor 134 may also receive, store, and/or display an on-screen graphical user interface (GUI) such as an Electronic Program Guide (EPG) 172, which may provide a schedule of program content and/or other features. Thus, the television tuner device 170 may be configured to execute and display (via the end-user display device 180) the EPG 172 based on television programming information received via the satellite 120 by the end-user equipment 130 from the electronic programming guide server 150. As used herein, the terms "electronic programming guide" or "EPG" may include an interface that includes a schedule of programming content provided to a user as part of a program service transmission system. The EPG 172 may include software and/or firmware executed by the television tuner device 170. The EPG 172 may comprise a database or may otherwise access a database containing information including, for example, names or titles of viewing events (programs), corresponding channel numbers and names, brief descriptions of the programs, start and finish times, and rating and content information related to the events. This information may be called EPG information or program information. Any suitable information may be included in the EPG information.

The television tuner device 170 may include or be communicatively coupled to a recorder 136, such as a DVR (digital video recorder). The recorder 136 may be integrated into the television tuner device 170 or may be a stand-alone device. The recorder 136 may be operated by a user who programs the device or receiver function to record a particular program at a specified time. When the program occurs, the recorder 136 will record and store the program, which can then be viewed later. In addition to this functionality, the recorder 136 may buffer a certain amount of content during a currently broadcast transmission. Buffering a currently broadcast transmission allows a user to pause and/or rewind the content of the transmission and to then display the content in a non-live or delayed manner.

The television tuner device 170 may include or be associated with a memory or other storage device 164, such as magnetic or optical storage. The storage device 164 may be operable to store data received from the decoded satellite signal. The storage device 164 may be operable to store data received from the decoded satellite signal. The storage device 164 may be volatile or non-volatile memory implemented using any suitable technique or technology such as, for example, random access memory (RAM), disk storage, flash memory, solid state, and the like. The storage device 164 may be located either within the receiver or separately from the receiver. The storage device may also be removable in nature. The stored data set may include audio and/or visual content to be transmitted and displayed through the display 180. Generally, audiovisual or audiovisual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As a result commands or settings from a user, videos or other programs may be stored locally in storage device 164. Stored programs may include for example recorded broadcasts, pay-per-view items and/or buffered portions of a current video broadcast. The storage device 164 may contain various partitions or separate storage portions and may be used for implementation of a program buffer, DVR digital video recorder resources, and/or an EPG data.

The storage device 164 may additionally store an application, file, module or other data that is useable by the processor 134. In one instance, a stored application may be executed by the processor 134 to display content on the display 180, for example display module 148. As used herein, an application or module includes processor executable code that may be run to carry out one or more functions associated with the television tuner device 170. "Processor executable code" includes any computer-readable media or commands that may be ultimately interpreted by a processor, such as HTML or XML files that are rendered into user-viewable applications by an application executed by the processor. Alternatively, the processor or the receiver may comprise a presentation device interface portion to hold this code.

The processor 134 may execute commands received from a user. User commands may be sent to the television tuner device 170 through the user input device 175 such as a remote or other wireless device, such as a remote control. The user input device 175 may be a remote control that allows the user to interact with the television tuner device 170. Specifically, the user input device 175 may permit an end-user to interact with the EPG 172 and/or recorded video displayed by the television tuner device 170 on the end-user display device 180 in accordance with features of certain embodiments disclosed herein. Information sent to the television tuner device 170 may include, for example, a command to change the displayed channel, a command to pause, fast-forward, and/or rewind a displayed program, a command to display an EPG 172, and/or a command to navigate through the EPG 172. Commands sent to the television tuner device 170 may be entered through a dedicated display menu.

Figure 2:
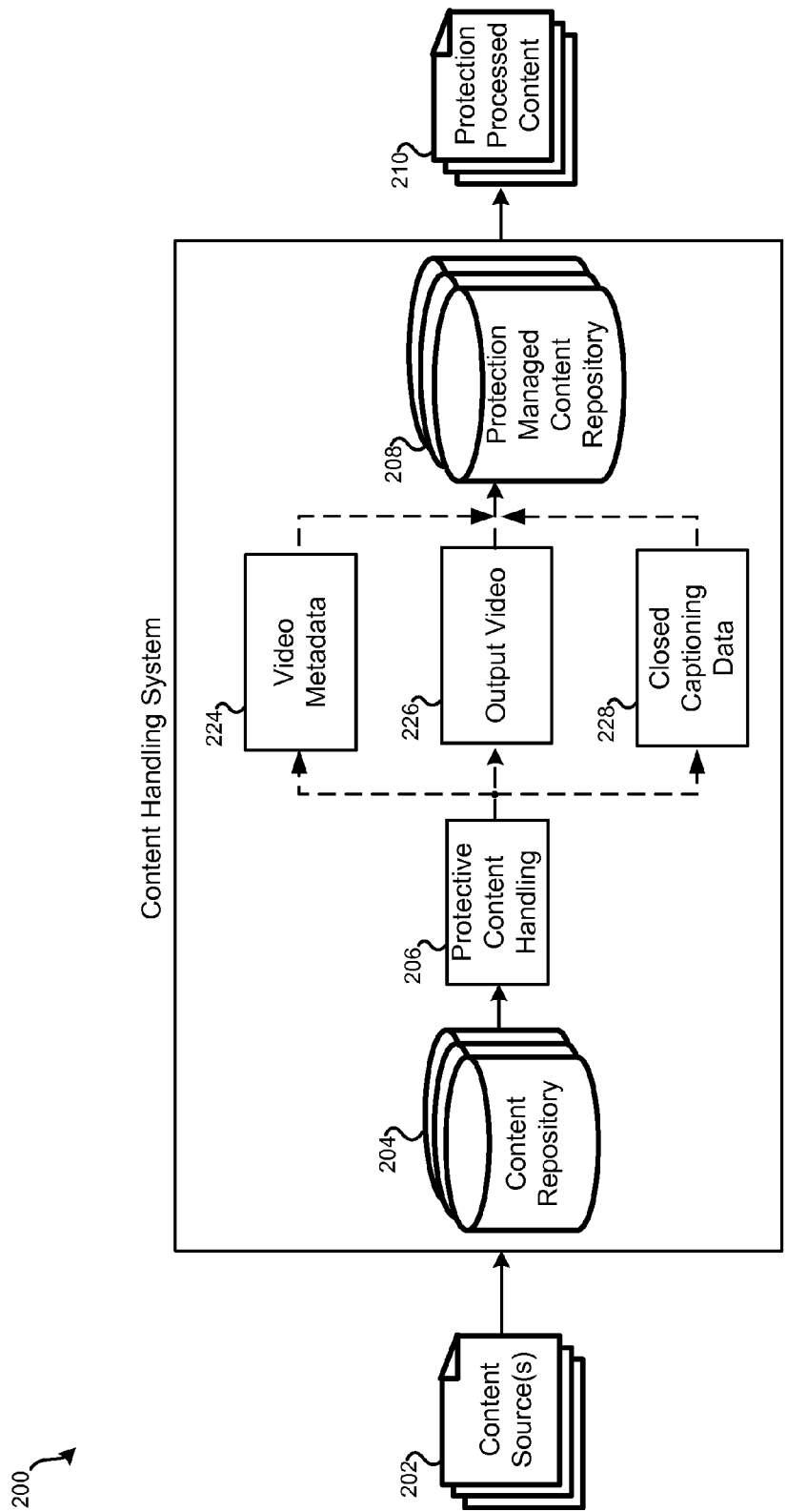
FIG. 2 illustrates a simplified embodiment of a content handling system, in accordance with certain embodiments of the present disclosure.

FIG. 2 is a simplified illustration of an embodiment of a content handling system 200, in accordance with certain embodiments of the present disclosure. In certain embodiments, the content handling system 200 may be included in the television service provider 135. In certain embodiments, the content handling system 200 may be separate from, and provide content to, the television service provider 135. In certain embodiments, the content handling system 200 may be included in the end-user system 165. In certain embodiments, the content handling system 200 may be included in the television tuner device 170. In certain embodiments, various features of the content handling system 200 may be distributed between the television tuner device 170 and upstream of the television tuner device 170.

The content handling system 200 may manage and/or distribute content in view of providing precautionary measures against potentially problematic video portions. The content handling system 200 may receive one or more content sources 202. The content sources 202 may correspond to movies, television programs, portions thereof, etc. The content sources 202 may include various components, including without limitation, one or more video tracks, audio tracks, metadata tracks, close captioning information, and/or the like. The content handling system 200 may retain received content sources 202 in one or more content repositories 204. The content repositories 204 may include any suitable form of storage media, such as any suitable form disclosed herein.

The content handling system 200 may include a protective content handling module 206. In some embodiments, the protective content handling module 206 may include instructions retained in a computer-readable media and to be executed by one or more processors. In some embodiments, the protective content handling module 206 may be configured to examine video component(s) of a content source 202 for potentially problematic portions. In some embodiments, a processor (such as a main processor, a core processor, digital signal processor, and/or like) may perform autocorrelation of related images in a buffered/recorded video stream to measure characteristics of the images. In some embodiments, brightness for a video sequence may be measured. In some embodiments, brightness measured on a frame-by-frame basis. For a given video frame or set of video frames, color may be quantified. The quantities assigned to the colors may be summed to indicate a brightness level for the frame. The brightness for each frame, or select frames, in a video sequence may be characterized to identify brightness peaks and relatively salient changes. Some embodiments may also implement noise filtering to improve the identification process.

Figure 3:
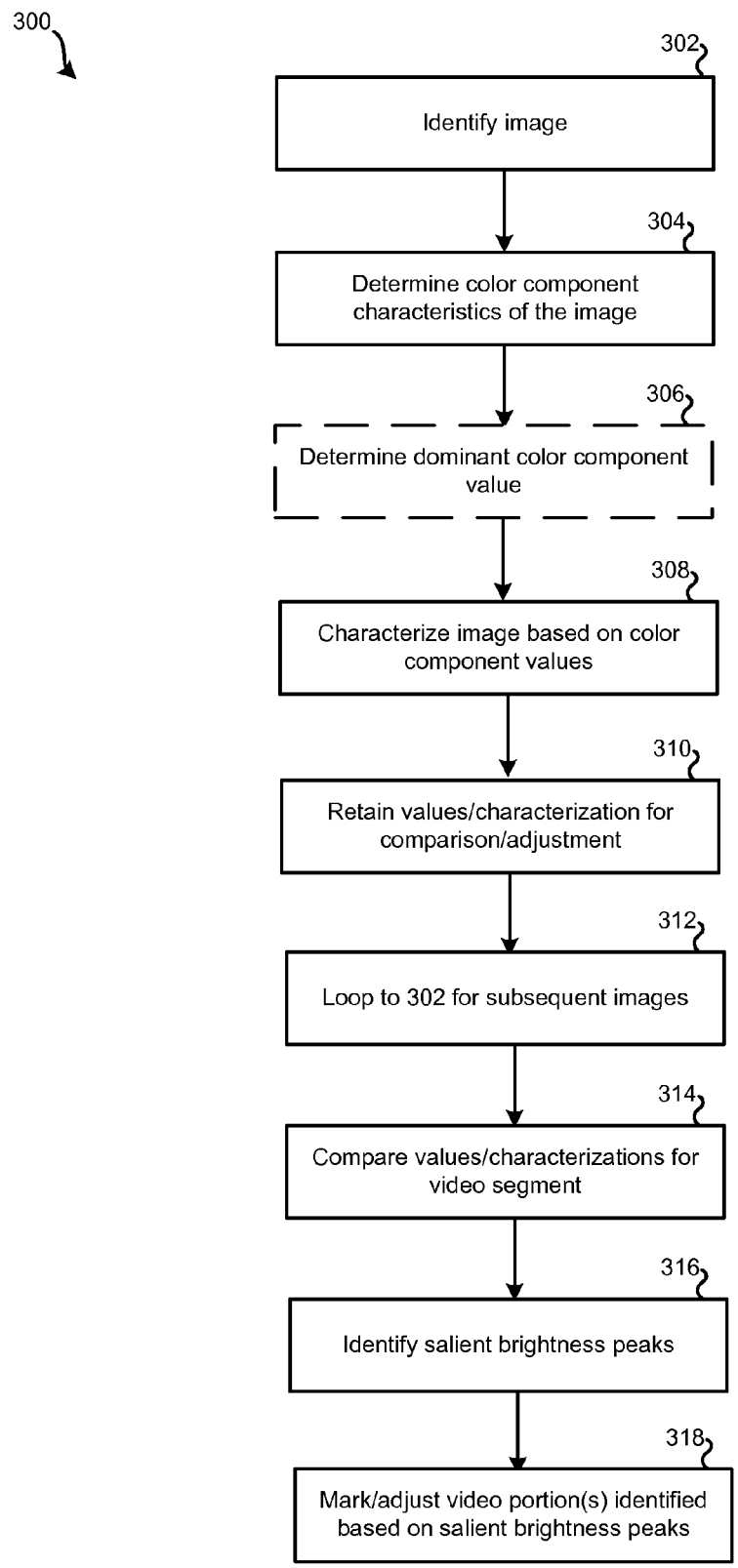
FIG. 3 illustrates a method of image characterization, in accordance with certain embodiments of the present disclosure.

FIG. 3 shows a method 300 of image characterization, in accordance with certain embodiments of the present disclosure. In step 302, an image may be identified. For example, an image may correspond to a frame or set of frames that comprise an image. In step 304, color component characteristics of the image may be determined. The color component characteristics typically include a plurality of color component values and may include or be correlated to a unit value corresponding to each color component value. For example, the unit value may indicate a number of pixels in the image having the corresponding color component value. In some embodiments, various color components may be identified; the component may include brightness. For example, the brightness may be represented by values ranging from 0 to 255, where a unit value for each brightness value indicates the intensity at that particular brightness value.

In some embodiments, as indicated by step 306, a dominant color component value from a plurality of color component values of the image may be identified. The dominant color component value may be, for example, the color component value having the highest unit value for all color component values of the image. In some embodiments, the dominant color component value may retained and utilized for later adjustment that may be specific to that dominant color component value, as opposed to adjustment of the entire frame or set of frames that comprise the image.

As indicated by step 308, the image may be characterized based on the plurality of color component values of the image. For example, the plurality of color component values may be summed or otherwise processed for assessment of the entire frame or set of frames that comprise the image. As indicated by step 310, the characterization of the image and/or the plurality of color component values may be retained for subsequent comparison/analysis and/or adjustment. As indicated by step 312, the process flow may loop to step 302 for subsequent images in the video segment. As indicated by step 314, the values and/or characterizations for the video segment may be compared. As indicated by step 316, one or more salient brightness peaks in the video segment may be identified. For example, the brightness peaks may have unit values greater than a threshold. As another example, the brightness peaks could exceed a certain proportion relative to one or more other peaks in the video segment. The time period during which the brightness peaks occur when displayed could be taken into account in identifying the salient brightness peaks. The increases and/or decreases to/from the brightness peaks could be taken into account in identifying the salient brightness peaks. As indicated by step 318, one or more video portions containing the salient brightness peak(s) may be adjusted or marked for later adjustment.

Figure 4:
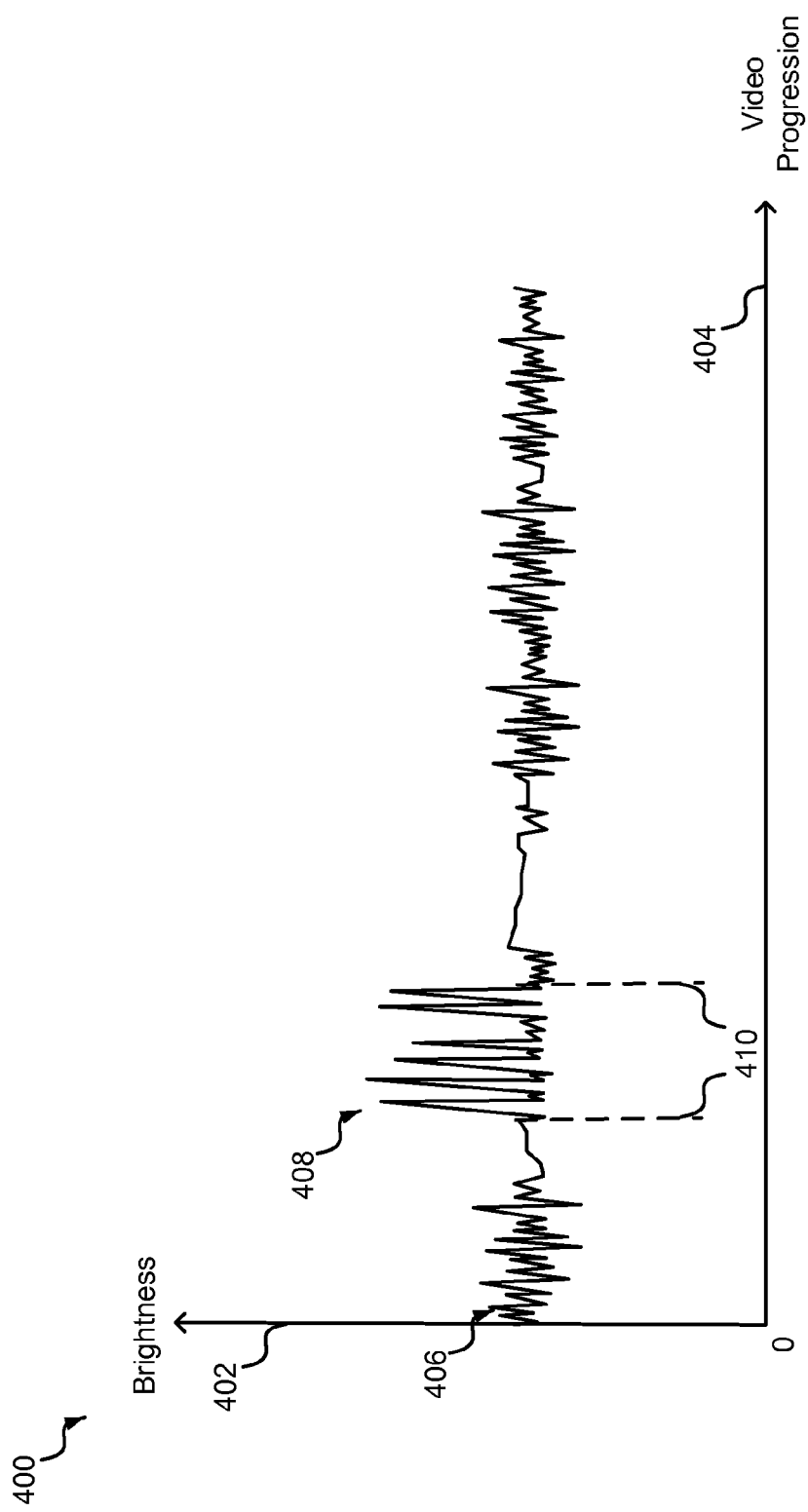
FIG. 4 illustrates an example of possible brightness characteristics for a given video segment when the values and/or characterizations for the video segment are compared, in accordance with certain embodiments.

FIG. 4 illustrates an example of possible brightness characteristics for a given video segment when the values and/or characterizations for the video segment are compared, in accordance with certain embodiments. Graph 400 characterizes brightness 402 versus video progression 404 for a particular video segment. It should be understood that the example of graph 400 is non-limiting. Brightness characterizations may vary greatly and depend on the particularities of various video segments.

As the program segment progresses, the colors of frames may be quantified and summed in any suitable way to indicate a brightness characterization 406 of the program segment, where frame brightness levels in program segment may be compared. The video progression 404 may be quantified in ordinal frame sequencing, frame time coding, display time, and/or in any suitable manner. One or more salient changes 408 may be identified. The salient changes 408 may have brightness peaks greater than those of other portions of the video segment by a certain threshold amount. The brightness peaks may have unit values greater than a threshold. In some embodiments, two or more peaks in a particular proximity may be identified as a problematic area. For example, two or more peaks may correspond to repeated flashing of say, camera flashing or strobe lighting. Some embodiments may utilize second-order integrals of brightness data to identify peaks or crossings, where positive or negative crossings of the data are identified as part of the process of identifying problematic video portions.

Some embodiments may identify particular frames corresponding to the salient changes 408. Some embodiments may further identify problem areas within particular frames. Accordingly, certain embodiments allow for addressing problem areas with greater specificity. For example, a problem area within a frame may correspond to a camera flash that is relegated only to a certain portion of the frame. As another example, a camera flash may be relegated to one or more delta frames that represent the change(s) between key frames.

In some embodiments, while light in an image may be measured/characterized. In some embodiments, an area of white light in an image may be measured/characterized. In some embodiments, the detection process could include algorithmic and/or heuristic aspects to account for image variance.

In some embodiments, the portion of the video including the salient changes 408 may be marked 410 for subsequent identification. The protective content handling module 206 may mark the video sequence in some embodiments. In some embodiments, the content handling system 200 may add close captioning information 228, which may include adding information to existing close captioning information 228, and/or adding a metadata track(s) 224, which may include adding metadata to existing metadata track(s) 224. The marking may indicate portions for the television tuner device 170 to handle. In some embodiments, the marking may indicate edits that instruct the television tuner device 170 how to modify a program.

The portion of the video including the salient changes 408 may be marked 410 in any suitable manner for incorporating associated data into an information stream. For example, the portion may be flagged in the video segment 226, or with metadata 224 associated with the video segment 226. In some embodiments, the marking may include time codes incorporated in the metadata and/or the video stream. Thus, time stamps may be used to indicate where in a program an edit or other method of handling is to be performed. In some embodiments, timestamp metadata can include timing information so that precise synchronization of metadata with the video is not necessary. In some embodiments, the marking may include textual metadata information in the video.

In some embodiments, the marking may be included in the closed captioning information 228. The marking may include a symbol or string of symbols selected to identify portion(s) of the video stream. In some embodiments, the marking may indicate particular frames and/or portions of frames.

In some embodiments, a program stream may be marked at distribution such that the television tuner device 170 receives a pre-marked stream. The television tuner device 170 may then suitably handle the flashing images in those marked portions of the received video stream. However, in some embodiments, the television tuner device 170 may correspond to the content handling system 200 and measure characteristics of the images. In some embodiments, the television tuner device 170 may mark a program. For example, marking of a program may be desirable if the program is being recorded, for it may be viewed at a later time. In some embodiments, the television tuner device 170 may identify and handle the flashing image portions without marking the program.

The content handling system 200 may retain marked content in one or more content repositories 208. The content repositories 206 may include any suitable form of storage media, such as any suitable form disclosed herein. The protection processed content 210 may thereafter be retrieved from repository 208 and transferred via any suitable distribution channel.

Figure 5:
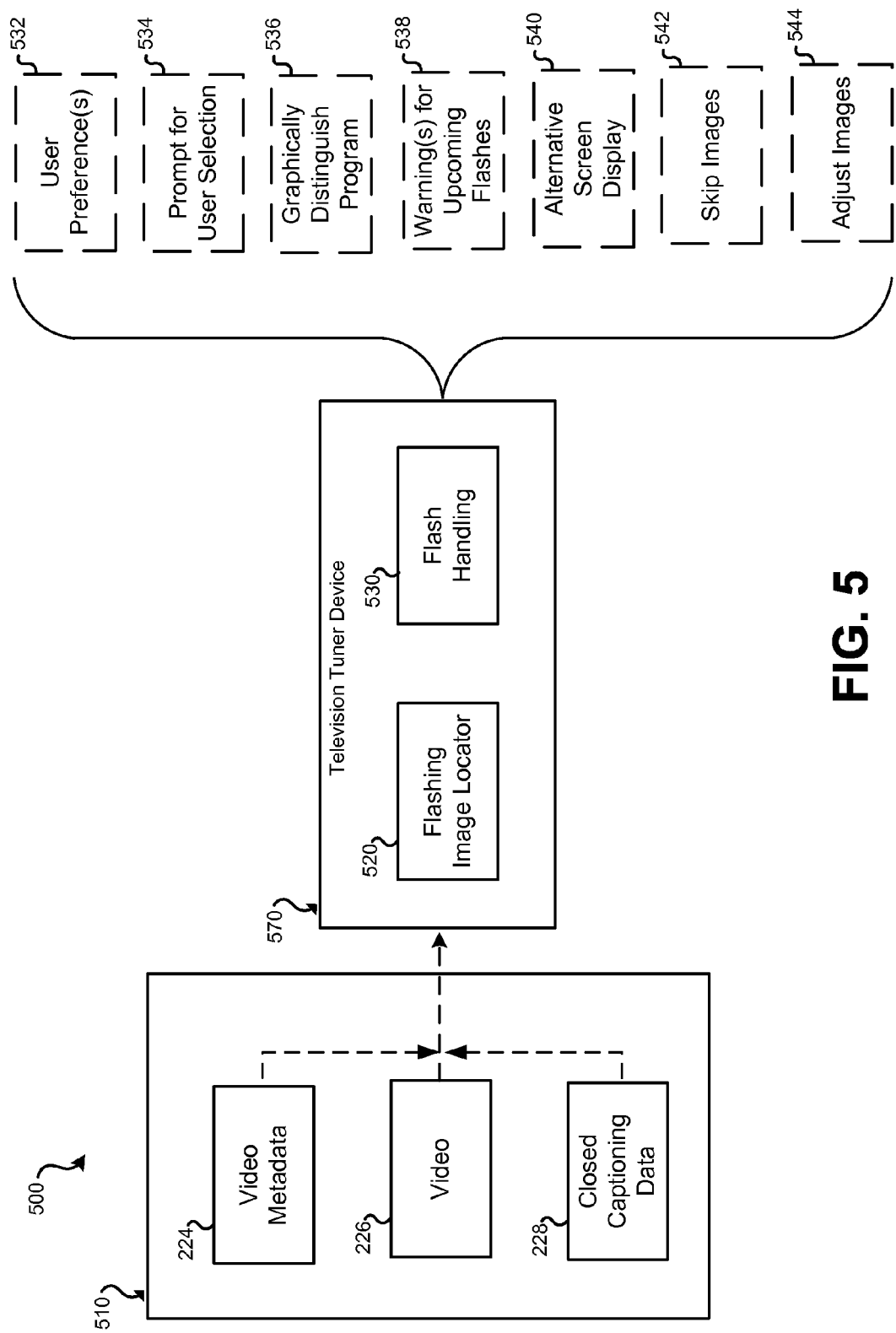
FIG. 5 illustrates a diagram of a system, in accordance with certain embodiments of the present disclosure.

FIG. 5 illustrates a diagram of system 500, in accordance with certain embodiments of the present disclosure. As depicted, the system 500 includes a television tuner device 570, which may correspond to the television tuner device 170 in certain embodiments. The television tuner device 570 may receive content 510 including a marked program segment. However, it should be understood that, in some alternate embodiments, the system 500 may be implemented in the content handling system 200. Thus, the system 500 may correspond to the protective content handling module 206, and one or more of the following precautionary features may be implemented upstream such that the television tuner device 570 receives protection processed content 210 in an edited form. In such a case, the television tuner device 570 may not need to implement any precautionary features or only certain precautionary features.

In the case of the television tuner device 570 receiving a marked program segment in content 510, as depicted, the television tuner device 570, via one or more processors and software instructions, may identify the marked portions. The television tuner device 570 may be configured to detect the markings according to any manner in which the program segment was marked. The television tuner device 570 may include a flashing image locator module 520 in some embodiments. The flashing image locator module 520 can be configured to receive the content 510, read the content 510 or certain portions thereof, and determine locations of flashing images in the video segment 226.

For example, in some embodiments, the flashing image locator module 520 of the television tuner device 570 may be configured to detect a symbol or string of symbols in received close captioning information 228 that indicate the flashing image portions. The flashing image locator module 520 may relate indicators in the close captioning information 228 to the video segment 226. For example, locating the flashing image portion(s) within the video segment 226 may be further based on matching a timestamp on the closed captioning information 228 to a timestamp for the video segment 226 of the content source 202. For example, the flashing image locator module 520 of the television tuner device 570 may be configured to detect As another example, in some embodiments, the flashing image locator module 520 may be configured to detect indicators in the video segment 226. The indicators may include time code information, frame offset information, flags, and/or the like. As another example, in some embodiments, the flashing image locator module 520 may be configured to detect pertinent metadata 224 associated with the video segment. The metadata may include time code information, frame offset information, flags, and/or any suitable indicators.

In some embodiments, the television tuner device 570 may include a flash handling module 530. The flashing image locator module 520 may identify the flashing image portions of the program to the flash handling module 530. In various embodiments, the flashing image locator module 520 may communicate the indicators extracted from the content 510 and/or information derived from the indicators.

In various embodiments, program portions that include flashing images may be handled in various ways. In some embodiments, the television tuner device 570 may allow for user selection of a precaution mode. For example, a precaution mode may be presented to the user as a menu option. The user may select any of the various precautionary options disclosed herein. Consequently, the television tuner device 570 may protectively handle flashing images in accordance with user preferences 532.

In some embodiments, the television tuner device 570 may identify a potentially problematic program stream and may automatically prompt for user selection 534 of a precaution mode. Such a prompt 534 could be presented to the user upon the user selecting a program for viewing. A prompt 534 could be presented to the user in accordance with user preferences 532.

In some embodiments, one or more programs containing flashing images could be graphically distinguished 536. In some embodiments, the programs could be identified in an EPG view. For example, a program could be highlighted in the EPG listing, differentiated by color, distinguishing with symbol(s)/text, and/or graphically distinguished in any suitable way. Consequent to a user selection of a precaution mode, the television tuner device 570 may protectively handle the flashing images in accordance with the precaution mode.

In some embodiments, the television tuner device 570 may identify an upcoming flash-containing portion in the program that a user is viewing. Any number and form of warnings 538 may be displayed to the viewer. For example, a warning 538 may be presented to indicate that flashing images are upcoming in the next 10 seconds (or any other time indication) of the program. This may enable a viewer to stop watching the program for the specific time period in any desired manner (e.g., turning off the display, changing channels, simply closing eyes or averting gaze, etc.). The could be multiple warnings 538 for an upcoming portion, such as a 15-minute warning, a five-minute warning, a two-minute warning, a 40-second warning, and the like. In some embodiments, a warning 538 could be a whole-screen warning. In some embodiments, a warning 538 could only be displayed in a portion of a screen such as a banner or any select area of the screen. In the case of multiple warnings 538, the warnings 538 could become progressively larger as the time for the flashing image nears in the program.

In some precaution modes, the television tuner device 570 may display an alternative screen 540. For example, the television tuner device 570 may display an alternative screen for the portion with the flashing images. For example, a blank screen or a message screen (e.g., one indicating the reason for the alternative screen) may be displayed instead of the portion with the flashing images. Such treatment may be desirable if live television is being displayed.

In some precaution modes, the television tuner device 570 skip a flashing image portion of the video stream. In some embodiments, the television tuner device 570 may buffer the video stream to facilitate skipping of a potentially problematic portion of the video stream. The program stream could be buffered in a digital video recorder (DVR)/programmable video recorder (PVR), for example. Accordingly, the program, as displayed to the viewer, may be delayed (e.g., 5 seconds, or any suitable time period) with respect to live viewing. These features could be implemented with any video recorded with the DVR/PVR. In some precaution modes, the television tuner device 570 may pause the program for the extent of the portion with the flashing images and then skipping the portion and resuming normal play after the program has progressed past the portion.

In some embodiments, the television tuner device 570 may adjust the images contained flashing 544. In some embodiments, the television tuner device 570 may dim a flashing image portion of the video stream. For example, the television tuner device 570 may adjust one or more display settings, such as brightness, contrast, and/or color settings. In some embodiments, an entire picture, image, and/or frame may be dimmed; in some embodiments, only a portion thereof may be dimmed. In some embodiments, only the flash image color(s) are changed. For example, the color component(s) characteristics corresponding to the flashes may be identified. The color component(s) could correspond to the dominant color component for a frame. The color component(s) corresponding to the flashes could be shifted to those of a reference color(s). The reference color could be set by default. The reference color could correspond to another color(s) in the same frame as the flash. The reference color could correspond to another color(s) in a different frame(s), such as one or more preceding and/or subsequent frames in the video sequence. In some embodiments, entire picture, image, and/or frame may be overwritten; in some embodiments, only a portion thereof may be overwritten. In some embodiments, a picture, image, and/or frame may be cropped to exclude flashes.

Figure 6:
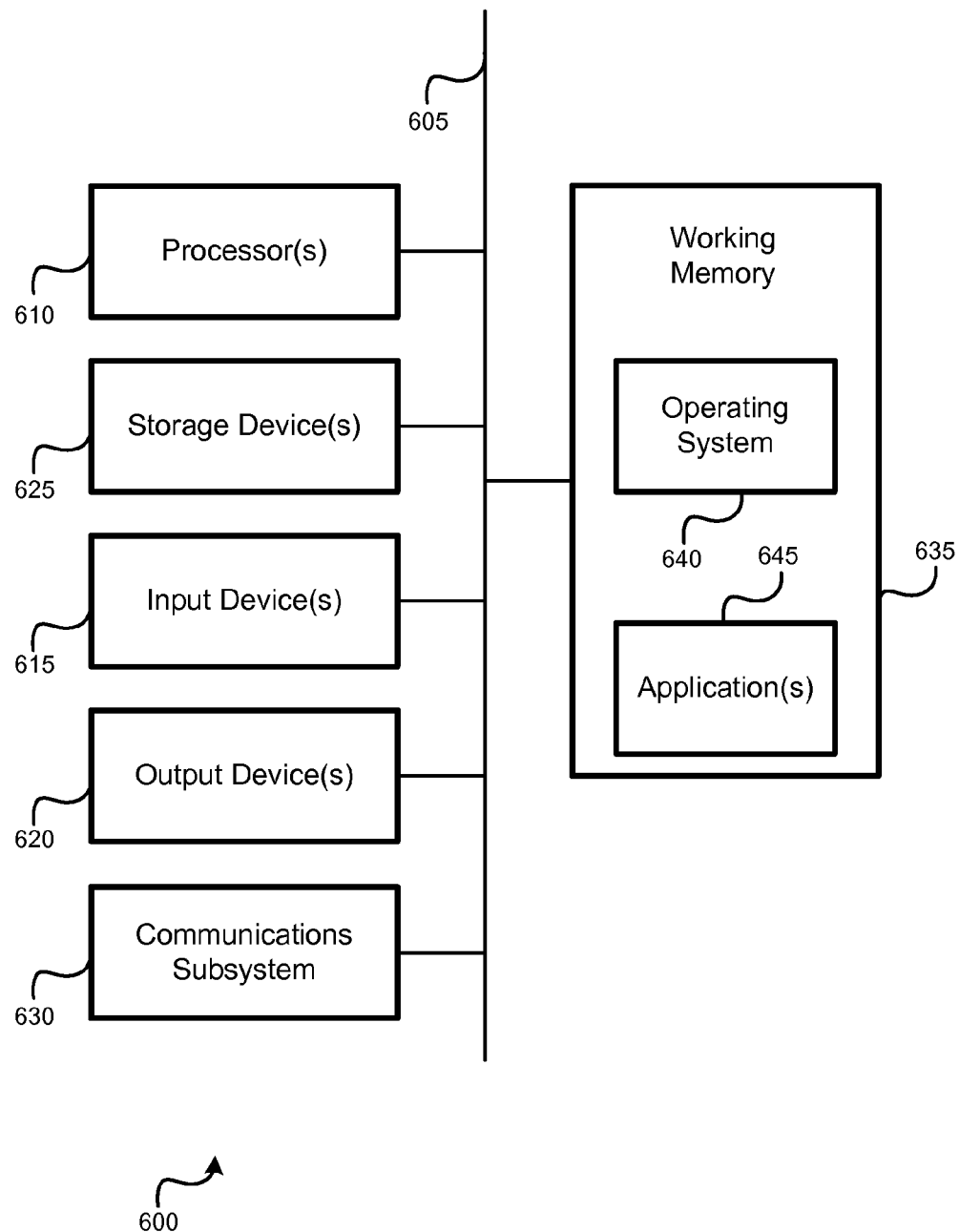
FIG. 6 illustrates an embodiment of a computer system, in accordance with certain embodiments of the present disclosure.

FIG. 6 illustrates an embodiment of a computer system 600. A computer system 600 as illustrated in FIG. 6 may be incorporated into devices such as a set top box (STB), a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, a camera, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 602.11 device, a WiFi device, a WiMax device, cellular communication facilities, etc.), and/or the like. The communications subsystem 630 may include one or more input and/or output communication interfaces to permit data to be exchanged with a network (such as the network described below, to name one example), other computer systems, television, and/or any other devices described herein. Depending on the desired functionality and/or other implementation concerns, a portable electronic device (or similar device) may communicate image and/or other information via the communications subsystem 630. In other embodiments, a portable electronic device, e.g. the first electronic device, may be incorporated into the computer system 600, e.g., a STB, as an input device 615. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) and features discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the technology. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bind the scope of the claims.

What is claimed is:

1. A method for providing photosensitivity protection for content displayable with a screen display, the method comprising:
   receiving video content and corresponding closed-captioning content at a media device;
   detecting, by the media device, one or more symbols within a first portion of the received closed-captioning content, the one or more symbols indicating flashing images within the received video content; and
   in response to detecting the symbols within the first portion of the closed-captioning content indicating the flashing images within the received video content:
   identifying, by the media device, one or more markings in the first portion of the received closed-captioning content;
      using the markings identified in the first portion of the received closed-captioning content to determine, by the media device, that one or more frames of the video content contain one or more flashes, wherein the determining comprises matching the markings identified in the first portion of the received closed-captioning content to corresponding markings associated with the determined frames of the video content;
      identifying one or more color components corresponding to the one or more flashes within the one or more frames of the video content;
      adjusting the one or more flashes by altering the one or more color components to match one or more reference colors that correspond to one or more additional color components of one or more preceding and subsequent frames of video content; and
      providing for display by the screen display the one or more frames of the video content.

2. The method for providing photosensitivity protection for content displayable with the screen display of claim 1, further comprising displaying one or more warnings about the flashing images within the received video content, the one or more warnings to indicate a time when the flashing images will be displayed on the screen display.

3. The method for providing photosensitivity protection for content displayable with the screen display of claim 2, wherein the one or more warnings about the flashing images are to be displayed during display of the video content.

4. The method for providing photosensitivity protection for content displayable with the screen display of claim 1, further comprising skipping the flashing images during video content display.

5. The method for providing photosensitivity protection for content displayable with the screen display of claim 4, further comprising:
   stopping the video content display before the flashing images are displayed during a live broadcast; and
   resuming the video content after the flashing images are displayed during the live broadcast.

6. The method for providing photosensitivity protection for content displayable with the screen display of claim 1, further comprising displaying an alternative screen.

7. The method for providing photosensitivity protection for content displayable with the screen display of claim 6, wherein the alternative screen comprises a blank screen.

8. The method for providing photosensitivity protection for content displayable with the screen display of claim 6, wherein the alternative screen comprises a message screen.

9. The method for providing photosensitivity protection for content displayable with the screen display of claim 1, further comprising:
   dimming a portion of the video content that comprises the flashing images.

10. The method for providing photosensitivity protection for content displayable with the screen display of claim 1, further comprising: adjusting the one or more color components to decrease a brightness characteristic.

11. A system for providing photosensitivity protection for content displayable with a screen display, the system comprising:
   a display device comprising a screen display;
   a media device communicatively coupled to the display device, wherein the media device comprises:
   one or more processors; and
   memory communicatively coupled with, and readable by, the one or more processors, the memory having stored therein processor-readable instructions, which, when executed by the one or more processors, cause the one or more processors to:
   receive from a content provider content comprising video content and corresponding closed-captioning content associated with the video content;
   detect one or more symbols within a first portion of the received closed-captioning content, the one or more symbols indicating flashing images within the received video content; and
   in response to detecting the symbols within the first portion of the closed-captioning content indicating the flashing images within the received video content:
      identifying, by the media device, one or more markings in the first portion of the received closed-captioning content;
      using the markings identified in the first portion of the received closed-captioning content to determine that one or more frames of the video content corresponds to the flashing images, wherein the determining comprises matching the markings identified in the first portion of the received closed-captioning content to corresponding markings associated with the determined frames of the video content;

identify a precaution against the flashing images based at least in part on the determined one or more frames of the video content that corresponds to the flashing images; and output to the display device, based at least in part on the precaution, one or more of at least a portion of the video content and/or information about the video content.

12. The system for providing photosensitivity protection for content displayable with a screen display of claim 11, wherein the precaution comprises displaying one or more warnings about the flashing images, the one or more warnings to indicate a time when the flashing images will be displayed.

13. The system for providing photosensitivity protection for content displayable with a screen display of claim 11, wherein the precaution comprises skipping the flashing images during the video content display.

14. A non-transitory computer-readable medium for providing photosensitivity protection for content displayable with a screen display, having sets of instructions stored thereon which, when executed by a computer, cause the computer to:

receive content comprising video content and corresponding closed-captioning content associated with the video content;

detect one or more symbols within the received closed-captioning content, the one or more symbols indicating flashing images within the received video content;

in response to detecting the symbols within the first portion of the closed-captioning content indicating the flashing images within the received video content:

identifying, by the media device, one or more markings in the first portion of the received closed-captioning content;

using the markings identified in the first portion of the received closed-captioning content to determine a portion of the video content that corresponds to the flashing images, wherein the determining comprises matching the markings identified in the first portion of the received closed-captioning content to corresponding markings associated with the determined frames of the video content;

determine a precaution against the flashing images based at least in part on the determining of the portion of the video content that corresponds to the flashing images; and output to a display device for presentation, based at least in part on the precaution, a warning message that changes in time as the flashing images near within the video content to notify a viewer about the flashing images within the video content.

15. The non-transitory computer-readable medium of claim 14, wherein the sets of instructions further cause the computer to output the warning message progressively larger over time as the flashing images near within the video content.

16. The method for providing photosensitivity protection for content displayable with the screen display of claim 1, wherein the closed-captioning content received by the media device is generated by a television service provider, by adding the one or more symbols indicating the flashing images within the received video content to the existing closed-captioning information corresponding to the received video content.

17. The method for providing photosensitivity protection for content displayable with the screen display of claim 1, further comprising:

determining, by the media device, within the frames of the video content that contain the one or more flashes, one or more particular frame portions that contain the one or more flashes, wherein the particular frame portions are determined based on the symbols detected within the corresponding closed-captioning content, and wherein adjusting the one or more flashes comprises altering the determined particular frame portions that contain the one or more flashes, without altering other frame portions within the same frames of the video content that contain the one or more flashes.

18. The system for providing photosensitivity protection for content displayable with a screen display of claim 11, further comprising:

a television service provider configured to add the one or more symbols indicating flashing images within the received video content to the existing closed-captioning information corresponding to the received video content.

19. The system for providing photosensitivity protection for content displayable with a screen display of claim 11, the memory having stored therein further processor-readable instructions, which, when executed by the one or more processors, cause the one or more processors to:

determine, within the frames of the video content that contain the flashing images, one or more particular frame portions that contain the flashing images, wherein the particular frame portions are determined based on the symbols detected within the corresponding closed-captioning content, and wherein adjusting the flashing images comprises altering the determined particular frame portions that contain the flashing images, without altering other frame portions within the same frames of the video content that contain the flashing images.

20. The method for providing photosensitivity protection for content displayable with the screen display of claim 1, wherein matching the markings comprises matching a first timestamp in the first portion of the received closed-captioning content to a corresponding timestamp associated with the determined frames of the video content.

* * * * *